United States Patent
Votaw et al.

(10) Patent No.: US 10,728,760 B2
(45) Date of Patent: Jul. 28, 2020

(54) FRICTIONLESS HARDENING OF DIGITAL CONSENT

(71) Applicant: Bank of America Corporation, Charlotte, NC (US)

(72) Inventors: Elizabeth S. Votaw, Potomac, MD (US); David J. Smiddy, Chadds Ford, PA (US); Fnu Sidharth, Charlotte, NC (US); Stephen T. Shannon, Charlotte, NC (US); James Alexander, Dripping Springs, TX (US)

(73) Assignee: Bank of America Corporation, Charlotte, NC (US)

( * ) Notice: Subject to any disclaimer, the term of this patent is extended or adjusted under 35 U.S.C. 154(b) by 244 days.

(21) Appl. No.: 15/642,471

(22) Filed: Jul. 6, 2017

(65) Prior Publication Data

US 2019/0014468 A1 Jan. 10, 2019

(51) Int. Cl.
*H04W 12/06* (2009.01)
*H04W 12/08* (2009.01)
(Continued)

(52) U.S. Cl.
CPC ............ *H04W 12/06* (2013.01); *G06F 21/31* (2013.01); *G06F 21/62* (2013.01);
(Continued)

(58) Field of Classification Search
CPC ..... H04L 63/00; H04L 63/08; H04L 63/0807; H04L 63/083; H04L 63/0838;
(Continued)

(56) References Cited

U.S. PATENT DOCUMENTS 6,105,007 A 8/2000 Norris
6,833,865 B1 12/2004 Fuller et al.
(Continued)

OTHER PUBLICATIONS

"Digital Onboarding with Consent to Use Customer Data," http://www.trunomi.com/solving-online-account-opening/; Apr. 30, 2015.
(Continued)

*Primary Examiner* — Shanto Abedin
*Assistant Examiner* — Adrian Stoica
(74) *Attorney, Agent, or Firm* — Weiss & Arons LLP; Michael A. Springs, Esq.

(57) ABSTRACT

Systems and methods leverage metadata to pin a digital consent to a particular customer. Metadata may include any information known about the customer. The systems and methods correlate the metadata with metadata gathered during the consent process. Metadata gathered during the consent process may include mobile phone profiles, biometrics, social-media attributes, etc. The systems and methods may utilize metadata to authenticate contemporaneously with obtaining consent. A browser-based tool may enable customers to use their mobile device to "sign" for their consent by clicking yes/no or other electronic selection. Such a tool may tie a customer's "consent" to their respective Party ID. This enables and preserves an after-the-fact record the customer has received, and consented to, the proper disclosures. The customer may receive a one-time authorization code transmitted to their mobile device which they enter into the website to ensure that this is truly their device while they provide consent.

16 Claims, 5 Drawing Sheets (51) Int. Cl.
| | |
|---|---|
| *H04L 29/06* | (2006.01) |
| *H04W 4/02* | (2018.01) |
| *G06Q 20/10* | (2012.01) |
| *G06Q 20/32* | (2012.01) |
| *G06F 21/31* | (2013.01) |
| *G06F 21/62* | (2013.01) |
| *H04L 29/08* | (2006.01) |
| *H04W 12/00* | (2009.01) |

(52) U.S. Cl.
CPC ......... *G06Q 20/1085* (2013.01); *G06Q 20/32* (2013.01); *H04L 63/0838* (2013.01); *H04L 63/102* (2013.01); *H04L 63/107* (2013.01); *H04W 4/02* (2013.01); *H04W 12/0602* (2019.01); *H04W 12/08* (2013.01); *H04L 63/0861* (2013.01); *H04L 67/306* (2013.01); *H04W 12/00503* (2019.01)

(58) Field of Classification Search
CPC ............. H04L 63/0846; H04L 63/0861; H04L 63/107; H04L 67/30; H04L 67/306; G06F 21/31; G06F 21/34; G06F 21/35; G06F 21/43; H04W 12/06; H04W 12/08; H04W 4/02
See application file for complete search history.

(56) References Cited

U.S. PATENT DOCUMENTS

| | | | |
|---|---|---|---|
| 8,191,776 | B2 | 6/2012 | Ben-Zvi et al. |
| 8,738,527 | B2 | 5/2014 | Kalinichenko et al. |
| 9,712,520 | B1* | 7/2017 | Canavor ............... H04L 63/083 |
| 10,142,308 | B1* | 11/2018 | Duchin ................... H04L 63/08 |
| 2006/0095956 | A1* | 5/2006 | Ashley ............... H04L 63/0823 726/4 |
| 2007/0244816 | A1 | 10/2007 | Patni et al. |
| 2009/0037995 | A1* | 2/2009 | Zapata .................... G06F 21/43 726/9 |
| 2010/0011431 | A1* | 1/2010 | Cynkin ............... G06F 21/6218 726/9 |
| 2012/0210011 | A1* | 8/2012 | Liu ........................ H04L 63/10 709/229 |
| 2015/0082404 | A1* | 3/2015 | Goldstein ............. G06F 16/685 726/7 |
| 2017/0004582 | A1* | 1/2017 | Engstrom ............... G06F 16/93 |

OTHER PUBLICATIONS

"GDPR, PSD2 & EPRIVACY: New Regulations Will Drive Financial Services Innovation," http://www.trunomi.com/gdpr-psd2-eprivacy-new-regulations-will-drive-financial-services-innovation/. Mar. 13, 2017.

* cited by examiner

FRICTIONLESS HARDENING OF DIGITAL CONSENT

FIELD OF TECHNOLOGY

This disclosure relates to technical improvements in performance and security when accessing a secure service.

BACKGROUND

Many secure services require consent to certain documents and/or disclosures. Practically, however, consent may be difficult to efficiently obtain.

For example, when a customer accesses certain secure services via the customer's mobile phone it may be difficult for the customer to contemporaneously review, and/or consent to, certain documents. Review of these documents may be required to engage the particular service in which the customer is interested and is currently attempting to activate and/or maintain.

As such, it would be desirable to enable a customer, when he or she is participating, on his or her mobile phone, in a contact session that is related to a service, to efficiently consent to aspects of the service, review certain documents associated with the service, and/or provide any other requirement that the service requires. Accordingly, it is an object of the invention to enable a customer, when he or she is participating, on his or her mobile phone, in a contact session related to a service, to consent to aspects of the service, review certain documents associated with the service, and/or satisfy any other requirements that the service requires.

SUMMARY

Systems and methods may leverage metadata to pin a digital consent to a particular entity and/or customer. Metadata may include any information known about the customer. The systems and methods may correlate the metadata with metadata gathered during the consent process. Metadata gathered during the consent process may include mobile phone profiles, biometrics, social-media attributes or any other suitable metadata. The systems and methods may utilize metadata to authenticate contemporaneously with obtaining consent. A browser-based tool may enable customers to use their mobile device to "sign" for their consent by clicking yes/no or any other suitable electronic selection. Such a tool may tie a customer's "consent" to their respective Party ID. This may enable and preserve an after-the-fact record that the customer has received, and consented to, the proper disclosures. The customer may receive a one-time authorization code. The one-time authorization code may be transmitted to their mobile device. The customer may enter the one-time authorization code into a website to ensure that the device is truly the customer's device, and that the device is in the possession of the customer, when the customer provides his or her consent.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for frictionless digital consent hardening are provided.

Methods may provide frictionless authentication of a mobile device user. A mobile device may include a primary application running on the mobile device. The primary device may provide access to one or more secure services. For example, the primary application may provide access to an online banking portal. The online banking portal may provide access to a variety of secure services. The primary application may require authentication before providing access to the secure services.

One or more of the secure services may require that a user provide digital consent before access the secure service. The digital consent may be required in addition to the authentication. A first level of authentication may be required when a user opens the primary application. One or more of the secure services may require that a user provide a second level of authentication.

Methods may include via the primary application running on the mobile device requesting a secure service accessible using the primary application. In response to the request for the secure service, methods may include initiating a secure line of communication from the mobile device to a secure remote system. Data transmitted on the secure line of communication may be encrypted using any suitable encryption method or any suitable encryption hardware.

Using the secure line of communication, methods may include receiving at the mobile device a first pre-authentication thread executable on the mobile device. Methods may include receiving at the mobile device a second pre-authentication thread executable on the mobile device. Methods may include receiving at the mobile device a consent procedure executable on the mobile device. The consent procedure may be executable on the mobile device before the primary application provides access to the secure service. The consent procedure may include information and/or requirements that a user may be required to consent and/or agree to prior to accessing the secure service.

Methods may include executing, in parallel on the mobile device, the first pre-authentication thread, the second pre-authentication thread and the consent procedure. The first pre-authentication thread and the second pre-authentication thread may be used to determine that the user providing the consent and/or agreement included in the consent procedure is indeed the individual identified in the consent procedure.

Some embodiments may include executing the first pre-authentication thread, the second pre-authentication thread and the consent procedure on remote server. When the threads and procedure are executed on the remote server, the remote server may access data stored on the mobile device using the secure communication line.

The first pre-authentication thread may inventory secondary applications installed on the mobile device. Secondary applications may include any application installed on the mobile device. Such applications may include, games, social media applications, photo applications, travel related applications or any application that stores data on the mobile device.

Based on requirements of the secondary pre-authentication thread and the consent procedure, the first pre-authentication thread may target one or more of the secondary applications. For example, the first pre-authentication thread may determine that the targeted applications are associated with a threshold likelihood for being associated with data that will be requested from the user (in the first thread, the second thread or the consent procedure). As a more specific example, the first pre-authentication thread may identify secondary applications that are likely to be associated with data that confirms a legal name of the user, a current location of the mobile device, past locations of the mobile device, biometric information associated with the user, a birthdate of the user, or any other suitable information that identifies the user.

The first pre-authentication thread may extract data stored on the mobile device and associated with the one or more targeted secondary applications. Based on the extracted data, the first pre-authentication thread may prematurely abort execution of the second pre-authentication thread. In some embodiments, based on the extracted data, the first pre-authentication thread may also prematurely abort execution of the consent procedure.

Prematurely aborting the second pre-authentication thread may reduce a time delay between the initiating of the secure line of communication and providing access to the secure service via the primary application. For example, the first pre-authentication thread may execute and obtain data that would have been requested from the user of the mobile device.

The first pre-authentication thread may execute and obtain the data faster than the user may be presented with requests for the data. The first pre-authentication thread may execute and obtain the data faster than the user may respond to requests for the data. The data extracted from the target applications may include information required by the second pre-authentication thread had the second pre-authentication thread not been prematurely aborted.

Data extracted by the first pre-authentication thread may be passed to the second pre-authentication thread before aborting the second pre-authentication thread. Data extracted by the first pre-authentication thread may be passed to the consent procedure before aborting the second pre-authentication thread.

Moreover, execution of the first pre-authentication thread may provide data that is corroborated (e.g., "hardened") by data from two or more applications. Such corroboration may provide more accurate and more precise data than data input by the user. Such corroboration may provide a higher threshold of reliability than data input by the user.

For example, the second pre-authentication thread may require a default number of inputs to authenticate the mobile device user. Data extracted by the first pre-authentication thread may correspond to each of the default number of inputs.

The default number of inputs may be determined by the consent procedure. For example, different types of secure services may be associated with different consent procedures. Each consent procedure may require its own set of user or system determined inputs. The required input may depend on the type of secure service requested or details associated with the requested secure service. For example, a secure service that involves a threshold value may require more or different inputs than a secure service that involves less than the threshold value.

The default number of inputs is determined based on a location of the mobile device. For example, if the location of the device corresponds to a location associated with one or more of the target applications, a first number of inputs may be required. If the location of the device does not correspond to any location associated with the target applications, a second number of inputs may be required. The second number may be greater than the first number.

The first executable pre-authentication thread may extract a first data set from a first secondary application running on the mobile device. The first data set may correspond to a requirement of the second pre-authentication thread. For example, an illustrative requirement may be a legal name of the mobile device user.

TABLE 1

Illustrative Requirements
Illustrative Requirements

Legal Name
Phone Number
Address
Secret question/answer (e.g., mother's maiden name)
Social Security Number
Birthdate
Biometric Information
Electronic Signature
Prior Authorizations
Recent Activities
Recent Locations The first executable pre-authentication thread may extract a second data set from a second secondary application running on the mobile device. The second data set may also correspond to the requirement of the second pre-authentication thread. Methods may include calculating a threshold inconsistency between the first data set and the second data set. In response to any threshold inconsistency between the data sets, methods may include maintaining execution of second pre-authentication thread.

For example, if the first data set and the second data do not match, the first pre-authentication thread may not be able to obtain a threshold level of corroboration. As a result of the lack of corroboration, the second pre-authentication thread may continue running and request that the mobile device user enter one or more authentication inputs.

There may be various threshold levels of inconsistency. When the inconsistency between the first data set and the second data set is determined to be above a first threshold level of inconsistency, methods may include terminating the secure line of communication. When the inconsistency between the first data set and the second data set is determined to be above a second threshold level of inconsistency, methods may also include locking access to the secure service. For example, if the level of inconsistency indicates that the mobile device user authenticated by the second thread is different from the mobile device user authenticated by the first thread, the system may determine that the inconsistency is above the second threshold level of inconsistency. In such instances, the system may lock access to the secure service. Such a threshold level of inconsistency, e.g., a second threshold level of inconsistency, may indicate an unauthorized attempt to access the secure service.

When the inconsistency between the first data set and the second data set is determined to be above the first threshold level of inconsistency, methods may include requiring completion of the second pre-authentication thread. Completion of the second pre-authentication thread may be mandatory prior to allowing access to the secure service via the primary application. The second thread may be configured to apply more rigorous authentication methods than the first thread.

In some embodiments, execution of the second pre-authentication thread may interrupt execution of the consent procedure. For example, the second pre-authentication thread may request one or more inputs from the mobile device user. The user input may be mandatory prior to completion of the consent procedure, and before allowing access to the secure service. The inputs requested and/or required by the second thread may authenticate the mobile device user before the mobile device user is enabled to provide inputs required by the consent procedure.

In some embodiments, execution of the second pre-authentication thread may require one or more inputs from the mobile device user after completion of the consent procedure, but before allowing access to the secure service. For example, the mobile device user may provide inputs required by the consent procedure and the second thread may confirm an identity of the mobile device user after the consent procedure has been completed.

Based on the data extracted from the targeting secondary applications, methods may include reducing a total number of mobile device user inputs required by the second thread. For example, the extracted data associated with the first thread may correspond to a threshold level of authentication. The threshold level of authentication may not be sufficient to allow access to the requested secure service. However, the threshold level of authentication achieved by the first thread, together with select inputs required by the second thread, may provide a sufficient level of authentication.

Methods for obtaining frictionless consent at a mobile device are provided. Methods may include activating a first application installed on the mobile device. The first application may provide a mobile device user access to a plurality of secure transactions and/or services.

TABLE 2

| Illustrative Transactions and/or Services Illustrative Requirements |
|---|
| Access to Online Banking Portal |
| New Credit Card Application |
| New Loan Application |
| Funds Transfer |

Methods may include, using the first application, requesting one of the plurality of secure transactions. In response to detecting the requested secure transaction, methods may include determining a consent level for the requested secure transaction. Some transaction may not require consent. Some transactions may require a rigorous consent procedure that includes responding to multiple queries for information. Some transactions may require a consent procedure that only includes one input.

Based on the determined consent level, methods may include inventorying one or more target applications installed on the mobile device.

Methods may include extracting data stored on the mobile device. Methods may include targeting applications based on data that is expected or typically associated with a target application. The target application may provide functionality unrelated to the requested transaction or service. For example, the requested transaction or service may be a financial transaction or service and the target applications may be social media applications.

Data extracted from the target applications may include a social media profile stored on the mobile device. Data extracted from the target applications may include contact information stored on the mobile device. Data extracted from the target applications may include one or more photos stored on the mobile device. Data extracted from the target applications may include metadata associated with photos or other data objects stored on the mobile device. Data extracted from the target applications may include GPS coordinates stored on the mobile device. Data extracted from the target applications may include biometric data stored on the mobile device.

Based on the data extracted from the target applications, methods may include generating a first user profile. The first user profile may be a system generated profile based on the data extracted from the target applications.

Methods may include initiating a digital consent procedure. The digital consent procedure may present information to a mobile device user before allowing the mobile device user to access a secure service. The digital consent procedure may inform the mobile device user of adverse consequences that may be associated with the requested secure service. The mobile device user may be required to provide consent and/or acknowledgement to the potential adverse consequences associated with the requested secure service.

Methods may include receiving inputs responsive to the digital consent procedure. The inputs may be received from the mobile device user. As each input is received, methods may include building a second user profile based on each input. Methods may include dynamically building the second user profile as each input is entered by the mobile device user.

For each received input that is responsive to the digital consent procedure, methods may include determining a level of correspondence between the first user profile and the second user profile. When the first user profile is determined to have a threshold level of correspondence to the second user profile, methods may include aborting the consent procedure. Aborting the consent procedure may reduce a time delay between the activating of the first application and providing access to the secure service. For example, if the first and system generated profile matches a critical input required by the consent procedure, methods may include aborting any further requests of the consent procedure. The corroboration provided by the matching inputs may be deemed sufficient to allow access to the secure transaction and/or service.

Methods may include transmitting the first user profile to a secure remote system. A third user profile may be stored on the secure remote system. For example, the secure remote system may provide access to a mobile device user's online banking portal. The third user profile may include information that is used as a basis of authentication when the mobile device user attempts to access the online banking portal.

Methods may include determining a level of correspondence between the first user profile and the third user profile stored on the secure remote system. The level of correspondence may indicate a level of reliability for the system generated first user profile. The level of reliability may be based on corroboration of one or more data elements associated with the first user profile.

If a threshold level of reliability is established for the system generated first user profile, methods may include aborting any further authentication requests. For example, when the first user profile is determined to have a threshold level of correspondence to the third user profile, aborting the consent procedure without receiving any inputs response to the consent procedure and allowing access to the secure service. In some embodiments, the user may be required to consent and/or agree to information included in the first thread, second thread and/or consent procedure. Upon receipt of the consent and/or agreement, and upon determination that the first user profile is determined to have a threshold level of correspondence to the third user profile, the system may abort the consent procedure. In some embodiments, the level of reliability may be utilized as an added check (e.g., "hardening") on authentication data entered by a mobile device user. The level of reliability may be used to determine that the mobile device user providing the consent and/or agreement to the information and/or requirements is indeed the appropriate user.

When there is a threshold level of dissonance between the first user profile and the second user profile, methods may include aborting the consent procedure and/or locking access to the secure service.

Apparatus for frictionless hardening of a digital consent received from a mobile device are provided. Apparatus may include a primary application running on the mobile device. The secure application may be configured to trigger execution of a digital consent procedure when a user of the device attempts to access a secure service provided by the secure application.

Apparatus may include an executable consent hardening thread. The consent hardening thread may be configured to be retrieved by the digital consent procedure. The digital consent hardening thread may be configured to execute simultaneously, or in parallel with, the digital consent procedure. The consent hardening thread and the digital consent procedure may execute in parallel on the mobile device.

The digital consent procedure may be configured to obtain a first number of user inputs before allowing the secure application to provide access to the secure service. The consent hardening thread may be configured to extract a second number of inputs from one or more secondary applications running on the mobile device. Based on the second number of inputs, the consent hardening thread may corroborate one or more of the first number of inputs obtained by the digital consent procedure.

If the corroboration exceeds a threshold level, the consent hardening thread may prematurely terminate the digital consent procedure. For example, the consent hardening thread may abort the digital consent procedure when each of the second number of inputs corresponds to one or more of the first number of inputs. After the premature termination of the digital consent procedure, the mobile device user may be allowed access to the secure service.

Premature termination of the digital consent procedure may reduce a time delay between the triggering of the digital consent procedure and the allowing access to the secure service.

The first number of inputs may be greater than the second number of inputs. The first number of inputs may be less than the second number of inputs. The first number of inputs may be equal to the second number of inputs. In some embodiments, the executable consent hardening thread cannot prematurely terminate the digital consent procedure before at least one of the first number of inputs is obtained by the digital consent procedure.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
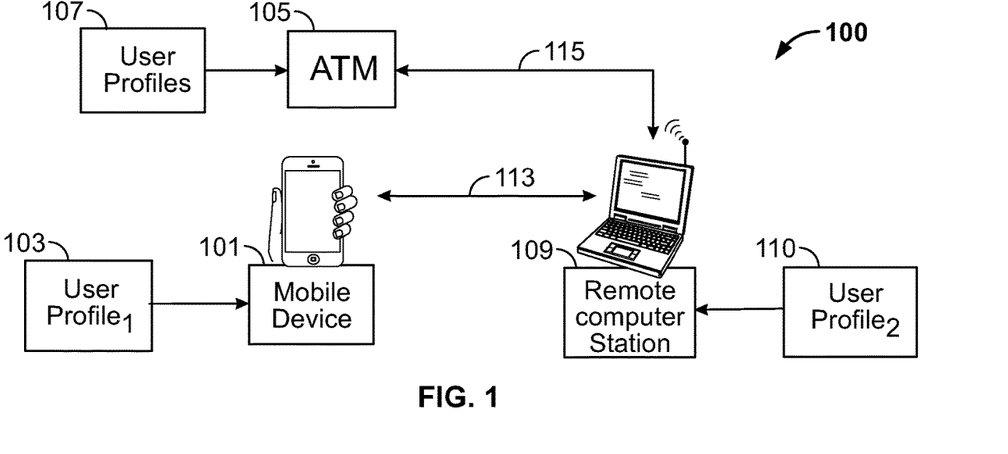
FIG. 1 shows an illustrative system architecture in accordance with principles of the disclosure.

FIG. 1 shows illustrative system architecture 100. Architecture 100 includes mobile device 101. Mobile device 101 may be associated with user profile 103. User profile may be a system generated profile. A system generated profile may be dynamically generated based on information stored on mobile device 101.

Mobile device 101 may communicate with remote computer system 109 using communication link 113. Remote computer system 109 may transmit executable code to mobile device 109 using communication link 113. The executable code may run on mobile device 101 and generate user profile 103. Remote computer system 109 may be associated with user profile 110. User profile 110 may be generated based on inputs provided by a user when the user accesses remote computer system 109. For example, remote computer system 109 may be a web server that provides the user with access to an online banking portal.

Architecture 100 includes automated teller machine ("ATM") 105. ATM 105 may communicate with remote compute system 109 using communication link 115. ATM 105 may be associated with user profile 107. User profile 107 may be generated based on inputs provided by a user when the user accesses ATM 105. User profile 107 may be identical to user profile 110. User profile 107 may be different from user profile 110.

Apparatus and method disclosed herein may corroborate one or more of user profiles 103, 107 and 110 based on comparing one user profile to one or more other user profiles. For example, system generated user profile 103 may be used to corroborate that a request to access remote computer system 109 has been received from a user of mobile device 101. Profiles 107 and 110 may be used to corroborate system generated profile 103.

Figure 2:
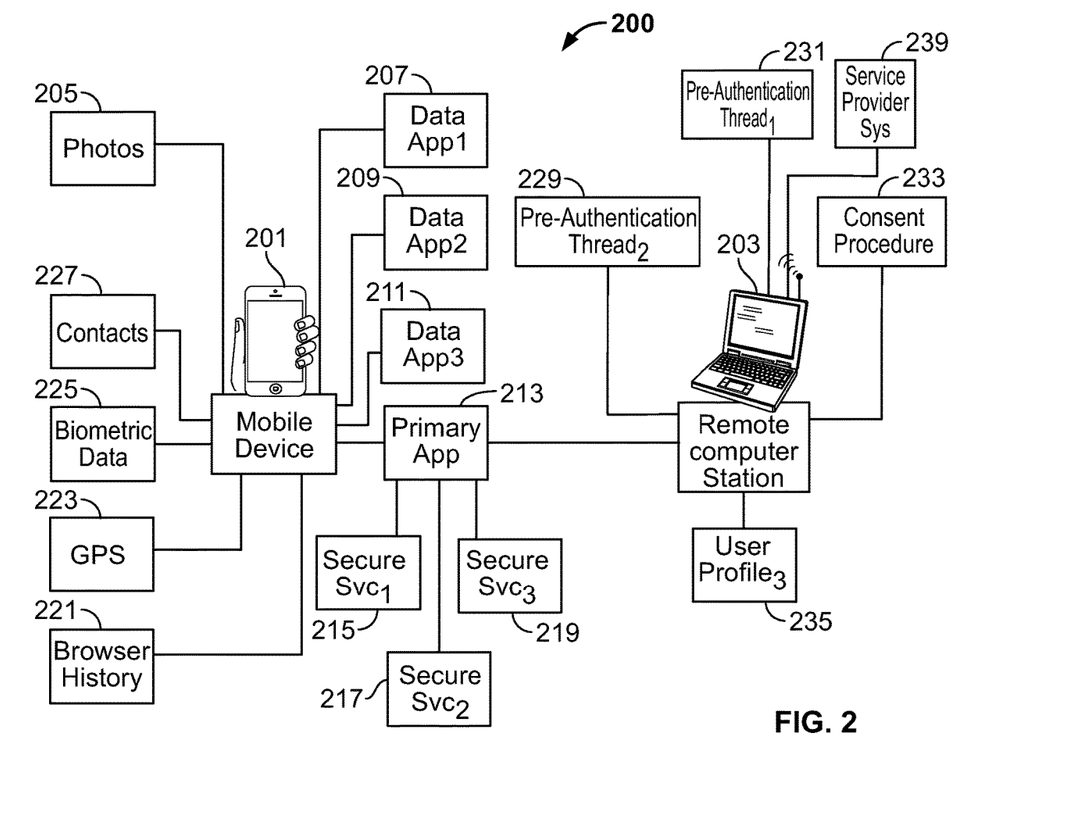
FIG. 2 shows an illustrative system architecture in accordance with principles of the disclosure.

FIG. 2 shows illustrative system architecture 200. Architecture 200 includes mobile device 201. Mobile device 201 may include one or more features of mobile device 101 (shown above in FIG. 1).

Architecture shows illustrative applications 207, 209 and 211 that may be installed on mobile device 201. Architecture 201 also shows that each of applications 207, 209 and 211 may be associated with data elements stored on mobile device 201. Architecture 201 shows that illustrative data elements include photos 205, contacts 227, biometric data 225, GPS data 223 and browser history 221. The illustrative data elements shown in FIG. 2 may be used to generate a system generated user profile for mobile device 201.

Mobile device 201 also includes primary application 213. Primary application 213 may be used to request and access a secure service. The secure service may include accessing remote computer system 203. Remote computer system may include one or more features of remote computer system 109 (shown in FIG. 1). Architecture 200 shows that primary application 213 may be associated with secure services 215, 217 and 219.

Each of secure services 215, 217 and 219 may be associated with a different level of corroboration (or hardening). For example, to access secure service 215 at one data element associated with system generated user profile (such as user profile 103 shown above in FIG. 1) must match a corresponding field in user profile 235 stored on remote computer system 203. To access secure service 217, all data elements associated with the system generated user profile (such as user profile 103 shown above in FIG. 1) must match a corresponding field in user profile 235 stored on remote computer system 203.

Remote computer system 203 may transmit one or more instances of pre-authentication threads 229 and 231 to mobile device 201. Pre-authentication thread 229 may be configured to generate a user profile based on data and/or applications on mobile device 201. Pre-authentication thread 231 may be executed in parallel with thread 229.

For example, thread 231 may request that user of mobile device 201 respond to one or more prompts. Thread 229 may dynamically corroborate user inputs responsive to thread 231. Thread 229 may utilize user inputs responsive to thread 231 to corroborate a user profile dynamically generated based on data stored on mobile device 201.

Thread 229 may corroborate a user profile using previously stored profile, such as user profile 235 stored on remote computer system 203.

Remote computer system may also push consent procedure to mobile device 201. Remote computer system may push consent procedure (or one or both of threads 229 and 231) in response to a request from service provider system 239.

For example, a mobile device user may enter a brick and mortar location to request access to a secure service. The mobile device user may be asked to acknowledge potential consequences associated with using the requested service. Although the mobile device user requested access to the secure service in person, threads 229 and 231 and consent procedure 233 may be pushed to the mobile device 201 of the user. Threads 229 and 231 may authenticate the user. Consent procedure may obtain the requested acknowledgement.

Threads 229 and 231 and consent procedure may be executed in parallel. Execution of threads 229 and 231 may shorten a time typically required to authenticate a mobile device user. Execution of threads 229 and 231 may shorten consent procedure 233. For example, execution of threads 229 and/or 231 may obtain and pass data to consent procedure 233 that would have otherwise been obtained via manual input from the mobile device user. Execution of threads 229 and 231 may corroborate or harden authentication of the mobile device user.

Figure 3:
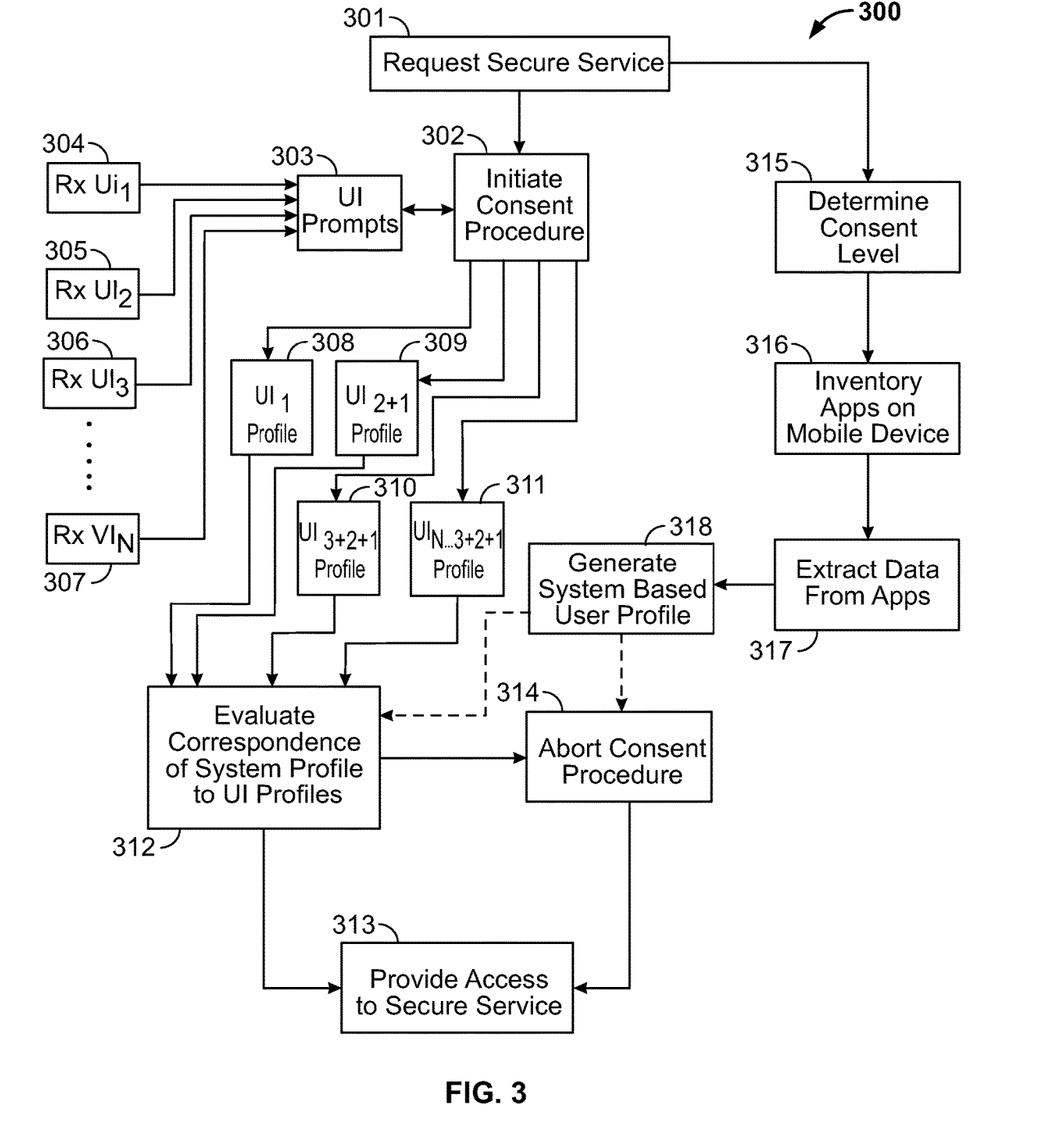
FIG. 3 shows an illustrative process in accordance with principles of the disclosure.

FIG. 3 shows illustrative process 300. For the sake of illustration, one or more of the steps of the process illustrated in FIG. 3 will be described as being performed by a "system." The "system" may include one or more of the features of apparatus (software and/or hardware) or processes described herein and/or any other suitable device or approach. For example, one or more steps of process 300 may be performed by devices 104, 102 and/or 105 (all shown above in FIG. 1). As a further example, one or more steps of process 300 may be performed by pre-authentication thread 215, pre-authentication thread 214 and/or consent procedure 216 (all shown above in FIG. 2). The "system" may be provided by an entity.

Process 300 may begin at step 301. At step 301, a mobile device user may request access to a secure service. Before providing access to the secure service, the system may attempt to authenticate the mobile device user. Before providing access to the secure service, the system may require that the mobile device user consent and acknowledge potential consequences associated with the secure service.

At step 302 the system initiates a consent procedure. At step 303, the consent procedure may begin to prompt the mobile device user for inputs. For example, the consent procedure may prompt the mobile device user for inputs to authenticate the mobile device user.

Process 300 shows that the mobile device user may begin to provide inputs 304-307 in response to prompts 303. Process 300 shows that for each of inputs 304-307 provided by the mobile device user, consent procedure 302 may generate a corresponding user profile 308-311. Each user profile 308-311 may be built on the preceding inputs provided by the mobile device user (steps 304-307).

Process 300 shows that in parallel with (1) receipt of mobile device user inputs 304-307 and (2) generation of user profiles 308-311, the system executes steps 315-318. At step 315, the system determines a consent level associated with the requested secure service. The consent level may be determined based on the consent procedure initiated at step 303. For example, the system may include multiple consent procedures, each consent procedure associated with a different level of rigor or other differences. Level of rigor may include how acknowledgement of the mobile device user is captured. Illustrative capture techniques may include a signature, entry of a social security number, entry of a biometric feature, initialing, checking a box, entry of a personal-identification-number ("PIN"), entry of a username and password or any other suitable method.

At step 316, the system inventories applications on the mobile device. At step 317, the system extracts data from one or more of the applications inventoried at step 316. At step 318, the system auto-generates a user profile based on the date extracted at step 317. In some embodiments, step 318 may be completed by the system before a user enters input 304.

In some embodiments, process 300 may proceed directly from step 318 to step 314. For example, the system may determine that a user profile auto-generated at step 318 exceeds a threshold level of reliability. When the user profile auto-generated at step 318 exceeds a threshold level of reliability, the system may prematurely abort the consent procedure initiated at step 302. For example, the system may rely on the auto-generated user profile without prompting and/or receiving any inputs 304-307 from the mobile device user.

Prematurely aborting consent procedure 302 may improve system performance by reducing time delay from a time when the secure service was requested at step 301 and a time the mobile device use is provided access to the secure service at step 313.

In some embodiments, at step 312, the system evaluates auto-generated user profile 318. For example, at step 312, the system evaluates a correspondence between the auto-generated user profile (step 318) and one or more of user profiles 308-311 built based on user inputs 304-307. If the correspondence between the auto-generated and one or more of user-input-based profiles 308-311 exceeds a threshold level of reliability, at step 314, the system aborts the consent procedure. The consent procedure may be aborted prematurely at step 314 before the mobile device user has been prompted for each of inputs 304-307.

At step 313, the system provides access to the requested secure service. In some embodiments (not shown) if at step 312 a threshold level of reliability is not established, the system may deny access of the mobile device user to the secure service requested at step 301.

Figure 4:
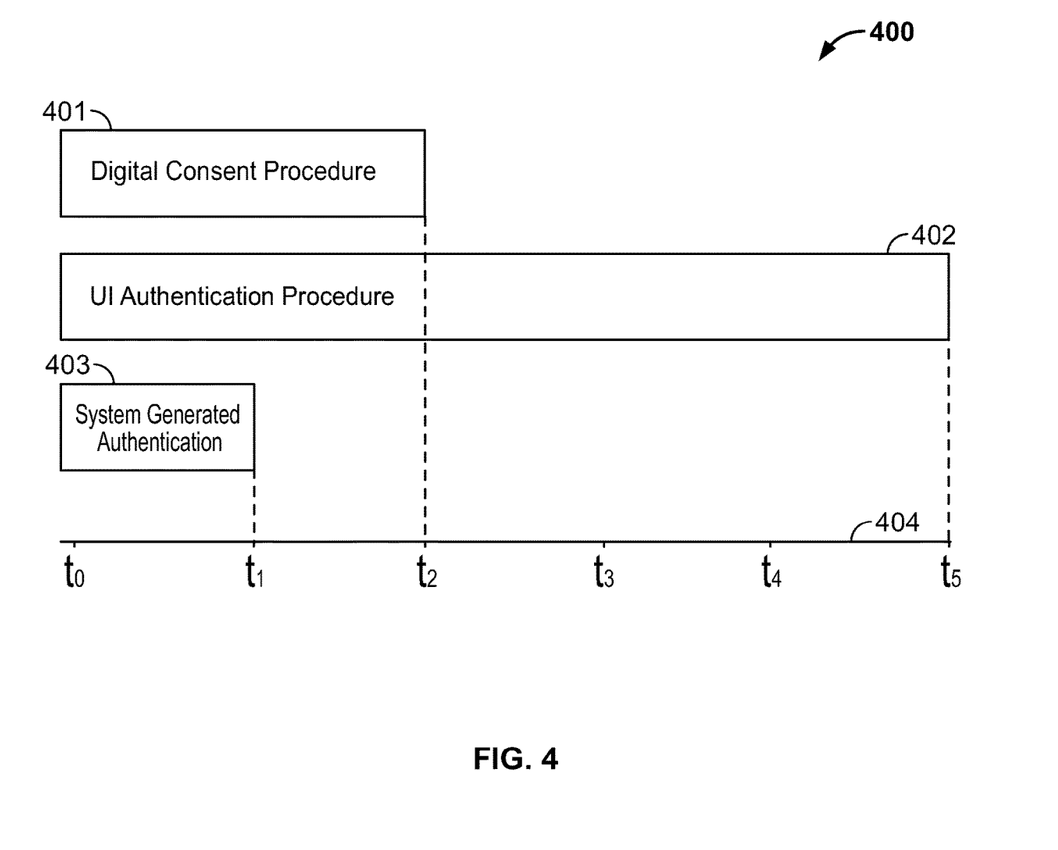
FIG. 4 shows illustrative information in accordance with principles of the disclosure.

FIG. 4 shows illustrative timing information 400. Timing information 400 may be associated with processes described herein. Timing information 400 shows that system generated user profiles, such as those generated at step 318 (shown above in FIG. 3), require only t1 units to fully execute. Timing information 400 shows that a user input based authentication procedure requires t5 units to fully execute. Timing information shows that the user based authentication procedure may take up to four times longer to complete than auto-generating system profiles 403.

Timing information 400 shows that a digital consent procedure requires t2 units to fully execute. Timing information shows that the digital consent procedure may take up to two times longer to complete than auto-generating system profiles 403.

Timing information 400 shows that significant time savings and procedural efficiency may be achieved my utilizing system generated authentication procedures 403. As shown above in FIG. 3, system generated authentication procedures may result in providing a mobile device user access to a secure service at t1.

FIG. 500 shows illustrative process 500. For the sake of illustration, one or more of the steps of the process illustrated in FIG. 5 will be described as being performed by a "system." The "system" may include one or more of the features of apparatus (software and/or hardware) or processes described herein and/or any other suitable device or approach. For example, one or more steps of process 300 may be performed by devices 104, 102 and/or 105 (all shown above in FIG. 1). As a further example, one or more steps of process 300 may be performed by pre-authentication thread 215, pre-authentication thread 214 and/or consent procedure 216 (all shown above in FIG. 2). The "system" may be provided by an entity.

Figure 5:
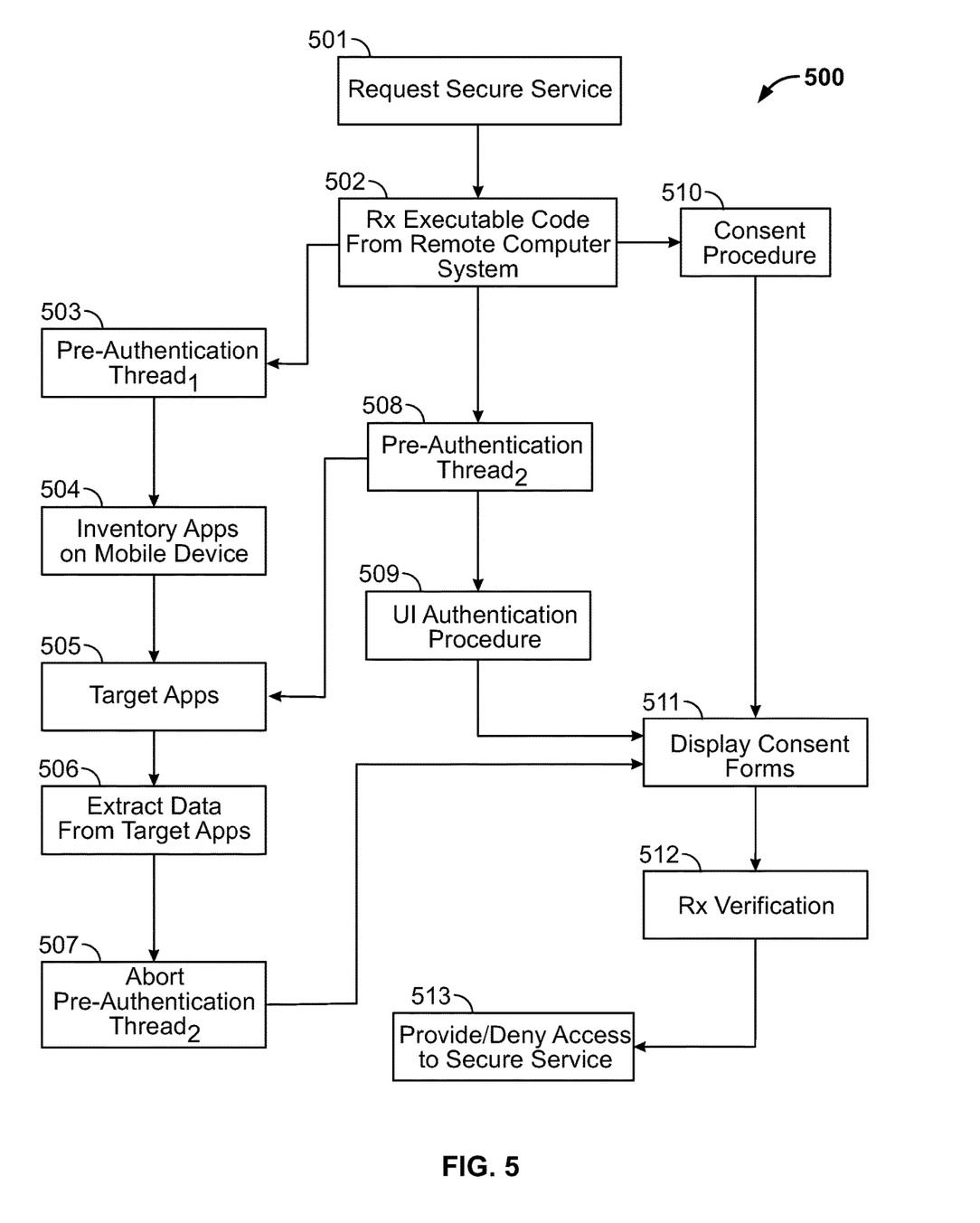
FIG. 5 shows an illustrative process in accordance with principles of the disclosure.

Process 500 may begin at step 501. At step 501, a user may request access to a secure service. The user may be a mobile device user. The user may user any suitable device to request access to the secure service. At step 502 the user device may receive executable code. The executable code may be transmitted to the use device from a remote computer system.

At step 510, the system begins execution of a consent procedure. At step 503, the system triggers execution of a first pre-authentication thread. At step 508, the system triggers a second pre-authentication thread.

Steps 503, 508 and 510 may be performed in parallel. The first and/or second pre-authentication threads may be executed on a device of the user. In some embodiments, the first and/or second pre-authentication threads may be executed on a remote computer system.

At step 504, the first pre-authentication thread inventories application stored on the user's device. At step 505, the first thread targets one or more of the applications. The applications may be targeted based on information that is expected or typically associated with such applications. In some embodiments, the targeting may be performed based on pre-determined criteria.

Process 500 shows that the targeting may be performed based on inputs from second thread 508. For example, in some embodiments, a user authentication procedure and a consent procedure may be performed independently. In some embodiments, a consent procedure may include a user authentication component.

Process 500 shows that at step 509, the second thread 508 may perform a user authentication procedure. The user authentication procedure may be a relatively slow procedure that requires input from a human user.

At step 506, the first thread extracts data from the targeted applications. At step 507, based on the extracted data, the first thread may abort the authentication procedure in progress at step 509. For example, a user may be authenticated based on the extracted data.

After the user is authenticated, at step 511 consent procedure 510 may display consent forms. The consent forms may be displayed in electronic format on any suitable device. For example, the consent forms may be displayed on a user device or a system device.

In some embodiments, step 511 may be performed before a user is authenticated. In such embodiments, the user may not be provided access to the secure service until after the authentication process is completed.

At step 512, the system receives verification that the consent and authentication procedures have been completed. At step 513, the system provides or denies access to the secure service. The system may provide access to the secure service when the authentication and consent procedures are successfully completed. The system may deny access to the secure service when the consent procedure is not completed or the authentication procedure is unable to reliably identify the user requesting the secure service.

Figure 6:
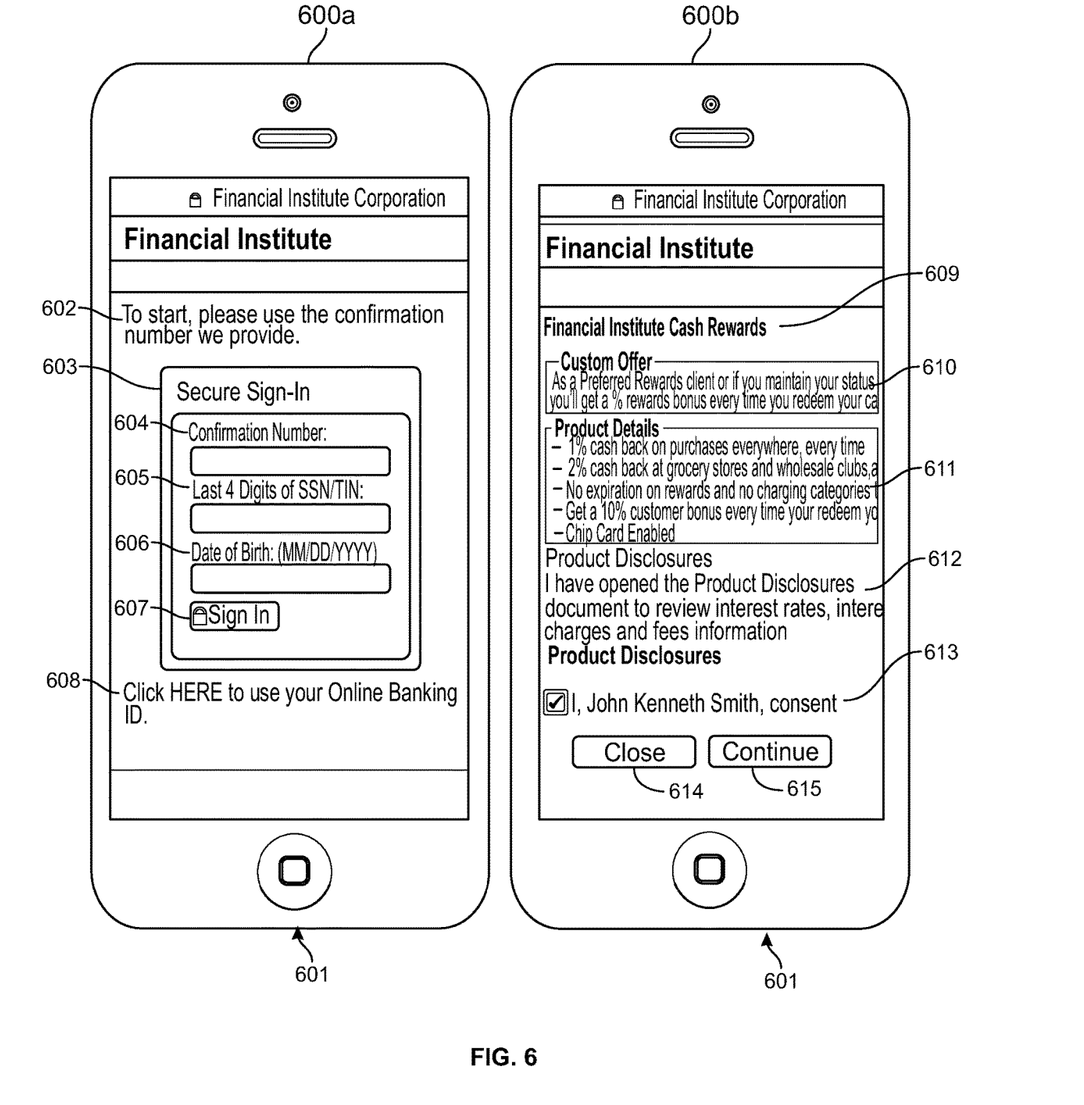
FIG. 6 shows illustrative apparatus and information in accordance with principles of the disclosure.

FIG. 6 shows illustrative mobile device 601. Mobile device 601 may include a processor for controlling overall operation of the device and its associated components, including RAM, ROM, input/output ("I/O") module, and memory. I/O module may include a microphone, keypad, touch screen and/or stylus through which a user of device 601 may provide input, and may also include one or more of a speaker for providing audio output and a video display device for providing textual, audiovisual and/or graphical output. Software may be stored within memory and/or other storage to provide instructions to the processor for enabling device 601 to perform various functions.

For example, memory may store software used by device 601, such as an operating system, application programs, and an associated database. Alternatively, some or all of computer executable instructions of device 601 may be embodied in hardware or firmware.

Device 601 may operate in a networked environment supporting connections to one or more remote computers or terminal. Terminals may be personal computers or servers that include many or all of the elements described above relative to device 601. The network connections may include a local area network (LAN) and a wide area network (WAN), and other networks. When used in a LAN networking environment, device 601 may be connected to LAN through a network interface or adapter. When used in a WAN networking environment, device 601 may include a modem or other means for establishing communications over WAN, such as the Internet.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application programs, which may be used by and stored on device 601, may include computer executable instructions for invoking user functionality related to communication, such as email, short message service (SMS), and voice input and speech recognition applications.

Device 601 may also be mobile terminals including various other components, such as a battery, speaker, and antennas. In some embodiments, remotely accessed computer systems or terminal may include be portable devices such as a laptop, tablet, smartphone or any other suitable device for receiving, storing, transmitting and/or displaying relevant information.

Any information described above in connection with the database of device 601, and any other suitable information, may be stored in memory. One or more of applications stored on device 601 may include one or more algorithms that may be used to generate user profiles, execute pre-authentication threads, execute consent procedures, compare system generated user profiles to user input based profiles and/or any other suitable tasks.

The invention may be operational with numerous other computing system environments or configurations. Examples of known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the context of computer-executable instructions, such as program modules, being executed by a computer. Generally, program modules include routines, programs, objects, components, data structures, etc. that perform particular tasks or implement particular data types. The invention may also be practiced in distributed computing environments where tasks are performed by remote processing devices that are linked through a communications network. In a distributed computing environment, program modules may be located in both local and remote computer storage media including memory storage devices.

FIG. 6 shows device 601 displaying illustrative screenshot 600a. Screenshot 600a shows an illustrative screen of a user input based authentication procedure. Screenshot 600a shows user instructions 602. Screenshot 600a also shows that dialog box 603 is displayed. Dialog box 603 includes prompts 604-606 for the user to provide inputs. By clicking button 607 the user responses to the prompts 604-606 may be transmitted to a remote computer system. Screenshot 600a also shows that button 608 gives the user an option to display a different set of prompts.

FIG. 6 shows device 601 displaying illustrative screenshot 600b. Screenshot 600b shows illustrative information 609-611 that may be associated with a consent procedure. Screenshot 600b shows that information associated with a consent procedure may be displayed in digital format on the user's mobile device.

Screenshot 600b shows that a consent procedure may display acknowledgement 613. The user may affirm acknowledgement of the information 609-612 by clicking check box 613. After reviewing consent information 609-612, the user may click button 614 and exit the consent procedure. If the user exits the consent procedure without affirming acknowledgement, the user may be denied access to the request secure service.

After reviewing consent information 609-612, the user may click button 614 and continue to access the requested secure service. In some embodiments, screenshot 600a may be displayed to the user before screenshot 600b. In such embodiments, after clicking button 615, the user may be provided access to the requested secure service. In some embodiments, screenshot 600b may be displayed to the user before screenshot 600a. In such embodiments, after clicking button 615, screenshot 600a may be presented to the user.

Thus, methods and apparatus for frictionless hardening of digital consent have been provided. Persons skilled in the art will appreciate that the present invention can be practiced by other than the described embodiments, which are presented for purposes of illustration rather than of limitation. The present invention is limited only by the claims that follow.

What is claimed is:

1. A method for frictionless authentication of a mobile device user, the method comprising:
   via a primary application running on the mobile device, requesting a secure service accessible using the primary application;
   in response to the request for the secure service, initiating a secure line of communication from the mobile device to a secure remote system;
   using the secure line of communication, receiving at the mobile device:
      a first pre-authentication thread executable on the mobile device and configured to authenticate the user without input from the user;
      a second pre-authentication thread executable on the mobile device and configured to obtain user inputs to authenticate the user; and
      a consent procedure executable on the mobile device before the primary application provides access to the secure service, said consent procedure for retrieving consent and/or agreement, from the mobile device user, to information and/or requirements associated with the secure service; and
   in parallel, executing on the mobile device the first pre-authentication thread, the second pre-authentication thread and the consent procedure, wherein the first pre-authentication thread and the second pre-authentication thread determine if the user is the individual identified in the consent procedure;
   the first pre-authentication thread when executed on the mobile device:
      inventories secondary applications installed on the mobile device;
      based on requirements of the secondary pre-authentication thread and the consent procedure, targets two or more of the secondary applications, the two or more secondary applications being associated with a threshold likelihood for being associated with data that will be requested in the secondary pre-authentication thread or in the consent procedure;
      extracts data stored on the mobile device and associated with the two or more targeted secondary applications, the extracting comprising:

extracting a first data set from a first secondary application running on the mobile device, the first data set corresponding to a requirement of the second pre-authentication thread; and extracting a second data set from a second secondary application running on the mobile device, the second data set also corresponding to the requirement of the second pre-authentication thread;

calculating a level of inconsistency between the first data set and the second data set;

in response to a threshold level of inconsistency between the first data set and the second data set:
terminating the secure line of communication;
locking access to the secure service; and
requiring completion of the second pre-authentication thread prior to completion of the consent procedure and before allowing access to the secure service via the primary application, the completion of the second pre-authentication thread including one or more inputs from the mobile device user; and in response to a level of inconsistency below the threshold level, and based on the data extracted from the two or more targeted secondary applications, prematurely aborting execution of the second pre-authentication thread and execution of the consent procedure, thereby reducing a time delay between the initiating of the secure line of communication and providing access to the secure service via the primary application.

2. The method of claim 1, wherein the extracted data associated with the two or more targeted secondary applications includes information required by the second pre-authentication thread, had the second pre-authentication thread not been prematurely aborted.

3. The method of claim 1, further comprising passing data extracted by the first pre-authentication thread to the second pre-authentication thread before aborting the second pre-authentication thread.

4. The method of claim 1, further comprising passing data extracted by the first pre-authentication thread to the consent procedure before aborting the second pre-authentication thread.

5. The method of claim 1, wherein the second pre-authentication thread requires a default number of inputs to authenticate the mobile device user and the data extracted by the first pre-authentication thread corresponds to each of the default number of inputs.

6. The method of claim 5, wherein the default number of inputs is determined by the consent procedure.

7. The method of claim 5, wherein the default number of inputs is determined based on a location of the mobile device.

8. The method of claim 5, wherein the default number of inputs is determined by the secure remote system based on the secure service.

9. The method of claim 1, wherein, complete execution of the second pre-authentication thread interrupts execution of the consent procedure by requiring one or more inputs from the mobile device user prior to completion of the consent procedure and before allowing access to the secure service.

10. The method of claim 1, wherein, complete execution of the second pre-authentication thread requires one or more inputs from the mobile device user after completion of the consent procedure and before allowing access to the secure service.

11. The method of claim 1 further comprising, based on the data extracted from the targeted secondary applications, reducing a total number of mobile device user inputs required by the second executable pre-authentication thread.

12. A method for obtaining frictionless consent at a mobile device, the method comprising:
activating a first application installed on the mobile device, wherein the first application provides a mobile device user access to a plurality of secure transactions;
using the first application, requesting one of the plurality of secure transactions;
in response to detecting the requested secure transaction, determining a consent level for the requested secure transaction;
based on the determined consent level:
inventorying one or more target applications installed on the mobile device, the target applications providing functionality outside of the context of the requested secure transaction; and
extracting data stored on the mobile device and associated with the target applications;
based on the data extracted from the target applications, generating a first user profile;
in parallel with the inventorying and extracting:
initiating a digital consent procedure, the digital consent procedure for receiving consent and/or agreement to information and/or requirements associated with the requested secure transaction;
receiving inputs responsive to the digital consent procedure;
as each input is received, building a second user profile based on each input;
for each received input responsive to the digital consent procedure, determining a level of correspondence between the first user profile and the second user profile; and
when the first user profile is determined to reach a threshold level of correspondence to the second user profile, aborting the consent procedure and allowing access to the requested secure transaction; and
when there is a threshold level of dissonance between the first user profile and the second user profile, aborting the consent procedure and locking access to the requested secure transaction.

13. The method of claim 12, further comprising:
transmitting the first user profile to a secure remote system;
determining a level of correspondence between the first user profile and a third user profile stored on the secure remote system; and
when the first user profile is determined to reach a threshold level of correspondence to the third user profile, aborting the consent procedure and allowing access to the requested secure transaction.

14. The method of claim 12 wherein the data extracted from the target applications comprises:
a social media profile stored on the mobile device;
contact information stored on the mobile device;
one or more photos stored on the mobile device;
GPS coordinates stored on the mobile device; or
biometric data stored on the mobile device.

15. A system that provides frictionless hardening of a digital consent received from a mobile device, the system comprising:
a secure application running on the mobile device, the secure application configured to trigger execution of a digital consent procedure when a user of the device attempts to access a secure service provided by the secure application, the digital consent procedure for obtaining consent and/or agreement relating to information and/or requirements associated with the secure service;

an executable consent hardening thread that is configured to be retrieved by the digital consent procedure and the executable consent hardening thread is configured to execute in parallel with the digital consent procedure;

the digital consent procedure is configured to obtain a first number of user inputs before allowing the secure application to provide access to the secure service; and the executable consent hardening thread is configured to:
- extract a second number of inputs from one or more secondary applications running on the mobile device;
- based on the second number of inputs, corroborate one or more of the first number of inputs obtained by the digital consent procedure;
- receive consent and/or agreement to the information and/or requirements required by the digital consent procedure;
- prematurely terminate the digital consent procedure when each of the second number of inputs corresponds to one or more of the first number of inputs; and
- after the premature termination of the digital consent procedure, allow access to the secure service;

wherein:
- the premature termination of the digital consent procedure reduces a time delay between the triggering of the digital consent procedure and the allowing access to the secure service; and
- the executable consent hardening thread cannot prematurely terminate the digital consent procedure before at least three of the first number of inputs are obtained by the digital consent procedure and corroborated by the executable consent hardening thread.

16. The system of claim 15, wherein the first number of inputs is greater than the second number of inputs.

\* \* \* \* \*